Feb. 23, 1926. 1,574,549
H. W. BIESHAR
TIRE INFLATING DEVICE
Filed Jan. 29, 1924
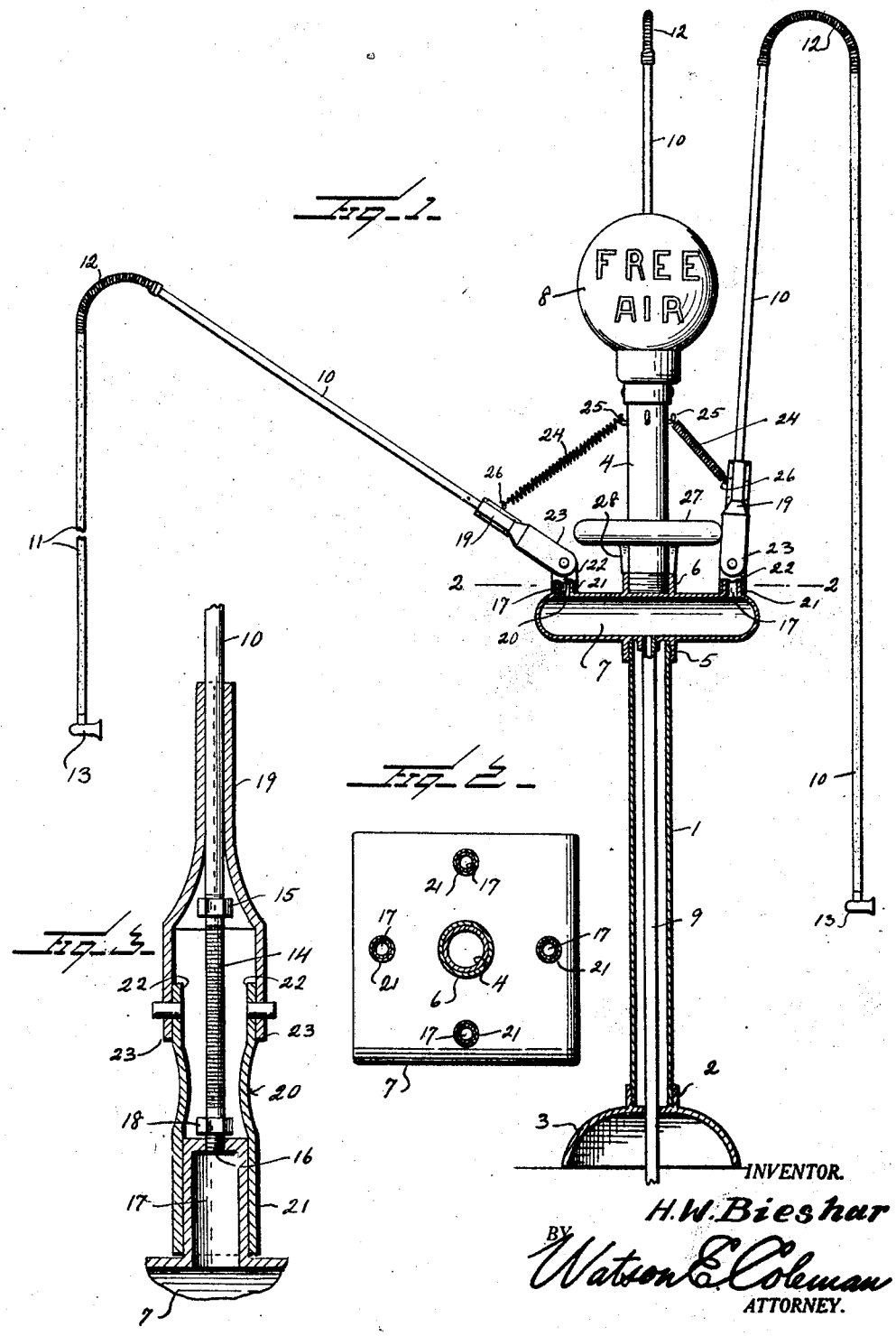
INVENTOR.
H. W. Bieshar
BY Watson E. Coleman
ATTORNEY.

Patented Feb. 23, 1926.

1,574,549

UNITED STATES PATENT OFFICE.

HENRY W. BIESHAR, OF OSKALOOSA, IOWA.

TIRE-INFLATING DEVICE.

Application filed January 29, 1924. Serial No. 689,341.

*To all whom it may concern:*

Be it known that I, HENRY W. BIESHAR, a citizen of the United States, residing at Oskaloosa, in the county of Mahaska and State of Iowa, have invented certain new and useful Improvements in Tire-Inflating Devices, of which the following is a specification, reference being had to the accompanying drawings.

This invention relates to an improved tire inflating device of the type positioned adjacent driveways so that an automobile may be driven to a point adjacent the filling device and an air hose drawn downwardly so that it may be connected with the tire.

Another object of the invention is to provide an air inflating device of this character in which a plurality of air hoses may be connected with a reservoir and any one of the hoses drawn downwardly for use.

Another object of the invention is to provide improved means for mounting the hoses for vertical and horizontal swinging movement and to so construct the hoses that they may be readily used without danger of them becoming twisted or otherwise bent out of shape so that the passage of air through the hose is interfered with.

Another object of the invention is to so mount the hoses that they may swing freely and to provide means for limiting upward swinging movement by springs serving to normally retain them in an elevated position.

Another object of the invention is to provide an improved type of stand carrying the air container or reservoir and bumper means and also serving to carry an illuminated head.

Another object of the invention is to provide a tire inflating device of this character which will be attractive in appearance and very serviceable and permit air to be supplied to more than one tire at a time.

This invention is illustrated in the accompanying drawings, wherein:—

Figure 1 is a view showing the tire inflating device partially in side elevation and partially in section;

Figure 2 is a transverse sectional view taken on the line 2—2 of Figure 1 looking downwardly;

Figure 3 is an enlarged fragmentary longitudinal sectional view through the means for mounting one of the air outlet pipes for swinging movement.

This improved tire inflating device is to be positioned adjacent a driveway in front of an automobile accessory and filling station and is provided with a standard 1 formed of pipe having its lower end in threaded engagement with the neck 2 of the base 3 which will be secured to the pavement or upon a suitable support in any desired manner. The upper portion 4 of the standard is also formed of pipe and these pipe sections 1 and 4 are in threaded engagement with the necks 5 and 6 extending from the reservoir tank 7. It will thus be seen that this tank 7 will be positioned intermediate the height of the standard which may have a head 8 provided at its upper end and illuminated by suitable electric light, not shown. The air supply pipe 9 which will lead from a suitable storage tank extends upwardly through the base 3 and lower portion of the standard and has its upper end connected with the reservoir so that air will be fed into the reservoir as it is used. This reservoir will preferably be rectangular in top plan, but it will be understood that it may be of any shape desired.

The outlet conduits or hose members through which the air passes to the tires are connected with the upper wall of the reservoir 7 and in the present illustration there has been shown four of these conduits but as many may be provided as desired. All of these conduits are of a duplicate construction and, therefore, only one will be described in detail.

Each of these conduits is provided with an inner section 10 formed of a small pipe and an outer section 11 which is formed of hose and is connected with the outer end of the pipe section 10 by a suitable coupling. A light spring 12 has been provided about the inner end portion of the hose 11 so that the hose will be prevented from crimping and preventing air from passing through the hose and eventually causing the hose to be weakened and broken off. The hose will also be provided with a conventional construction of chuck 13 for engaging the valve stem of the automobile tire. The reinforced hose section 14 is connected with the inner end of the pipe section 10 by the coupling 15 and has its inner end connected with a nipple 16 extending from the boss 17 of the reservoir 7, by a coupling 18 which is similar to the coupling 15 and this reinforced hose section 14 extends through a mounting member having an upper section 19 and a lower section 20. The lower section 20 is provided with a tubular lower end portion 21 which fits loosely about the nipple 17 so that it can turn freely thereon and this lower section is provided with upwardly extending arms 22 pivotally connected with the arms or ears 23 of the upper section 19. This upper section 19 is preferably formed in two parts releasably secured so that they may be tightly clamped about the inner end portion of the pipe section 10. It will thus be seen that by means of this mounting, the pipe 10 may have vertical swinging movement and may also be swung horizontally. It is desired to have the outlet conduits normally held in an elevated position and there has, therefore, been provided springs 24 which have their upper ends connected with hooks 25 carried by the upper section 4 of the standard and their lower ends connected with hooks 26 carried by the sections 19 of the means for mounting the pipes for vertical and horizontal swinging movement. Therefore, these pipes 10 will be normally held in an elevated position but may be swung downwardly for use. It is also desired to limit the upward swinging movement of these pipes and in order to do so, there has been provided a bumper ring 27 which is positioned about the upper section of the standard and connected with this upper standard section by supporting arms 28.

When this device is to be used, it is mounted at a convenient point near the driveway and the air supply pipe 9 will be connected with the main supply tank so that compressed air will be fed through the pipe 9 into the reservoir 7. Under normal conditions the pipe sections 10 will be held substantially vertical by the springs 24 and the flexible pipes or hoses 11 will hang downwardly. By grasping the hose 11 it may be drawn downwardly as far as desired so that the chuck 13 may be connected with the valve of a tire to be inflated. When in this position, the chuck will be connected with the valve in the usual manner and air will pass through the pipes 10 and 11 and into the tire. Since the pipe 10 is mounted for vertical swinging movement and horizontal swinging movement, it is not necessary to stop the automobile at any particular point in order to permit the tire to be inflated from this inflating device. It will be further noted that with this construction more than one tire may be inflated at a time, and tires upon separate automobiles could be inflated at the same time by simply drawing downwardly the desired number of hoses. After the tire has been inflated, it is simply necessary to release the hose and the spring 24 will return the hose 11 and pipe 10 to the normal position where they will be out of the way and not liable to be damaged by an automobile or heavy truck passing over them.

What is claimed is:—

1. A tire inflating device comprising a hollow standard, a reservoir positioned intermediate the height of said standard, a supply pipe passing upwardly through the lower portion of said standard and communicating with said reservoir, outlet conduits having communication with said reservoir and pivotally mounted for vertical swinging movement, resilient means normally retaining said conduits in an elevated position, and bumper means about said standard above the reservoir for limiting upward swinging movement of the conduits.

2. A tire inflating device comprising a standard, a reservoir carried by said standard, a bumper carried by said standard above the reservoir, a boss extending upwardly from said reservoir, a nipple carried by said boss, an outlet conduit including a rigid pipe section, a hose leading from the outer end of the rigid pipe section, a flexible pipe section connected with the inner end of the rigid pipe section and with said nipple, means for mounting the rigid pipe section for horizontal and vertical swinging movement and including an inner member rotatably fitting upon said boss, and an outer member clamped to the inner end portion of the rigid pipe section and pivotally connected with the inner member for vertical swinging movement, and spring means connected with the outer member and upper portion of said standard to normally retain the rigid pipe section and outer mounting member swung upwardly to a substantially vertical position with the outer mounting member in engagement with said bumper.

In testimony whereof I hereunto affix my signature.

HENRY W. BIESHAR.